United States Patent
Fukumoto et al.

(10) Patent No.: US 8,521,202 B2
(45) Date of Patent: Aug. 27, 2013

(54) MOBILE STATION DEVICE, WIRELESS COMMUNICATION SYSTEM, MOBILE STATION DEVICE CONTROL METHOD, AND MOBILE STATION DEVICE CONTROL PROGRAM

(75) Inventors: Shusaku Fukumoto, Osaka (JP); Keiji Hikoso, Osaka (JP); Yusuke Takagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 576 days.

(21) Appl. No.: 12/744,442

(22) PCT Filed: Nov. 26, 2008

(86) PCT No.: PCT/JP2008/071404
§ 371 (c)(1),
(2), (4) Date: May 24, 2010

(87) PCT Pub. No.: WO2009/069631
PCT Pub. Date: Jun. 4, 2009

(65) Prior Publication Data
US 2010/0261496 A1    Oct. 14, 2010

(30) Foreign Application Priority Data
Nov. 27, 2007    (JP) .................................. 2007-305857

(51) Int. Cl.
*H04Q 7/32*    (2006.01)

(52) U.S. Cl.
USPC ........ 455/517; 455/500; 455/67.11; 455/434; 455/550.1; 455/432.1

(58) Field of Classification Search
USPC ........... 455/517, 500, 434, 432.1, 437, 67.11, 455/550.1, 422.1, 403, 412.1, 412.2, 575.1, 455/557, 515, 423–425, 426.1, 426.2, 414.1–414.4
See application file for complete search history.

(56) References Cited

U.S. PATENT DOCUMENTS

| | | | |
|---|---|---|---|
| 7,139,571 B1 | 11/2006 | Ishikawa et al. | |
| 2002/0137513 A1 | 9/2002 | Aihara et al. | |
| 2004/0053626 A1* | 3/2004 | Yagi | 455/456.1 |
| 2004/0192347 A1* | 9/2004 | Leizerovich et al. | 455/456.1 |
| 2008/0167044 A1* | 7/2008 | Natsume | 455/437 |

FOREIGN PATENT DOCUMENTS

| | | |
|---|---|---|
| JP | 2001-28778 A | 1/2001 |
| JP | 2001-69063 A | 3/2001 |
| JP | 2001-169339 A | 6/2001 |
| JP | 2006-246121 A | 9/2006 |
| JP | 2007-27877 A | 2/2007 |
| JP | 2007-43573 A | 2/2007 |

* cited by examiner

*Primary Examiner* — Keith Ferguson
(74) *Attorney, Agent, or Firm* — Birch, Stewart, Kolasch & Birch, LLP

(57) ABSTRACT

A mobile station device, which communicates with a base station device, includes a control signal generator that initiates or terminates a cell search based on a reception quality value of a radio wave transmitted from the base station device, and a moving speed of the mobile station device.

18 Claims, 7 Drawing Sheets

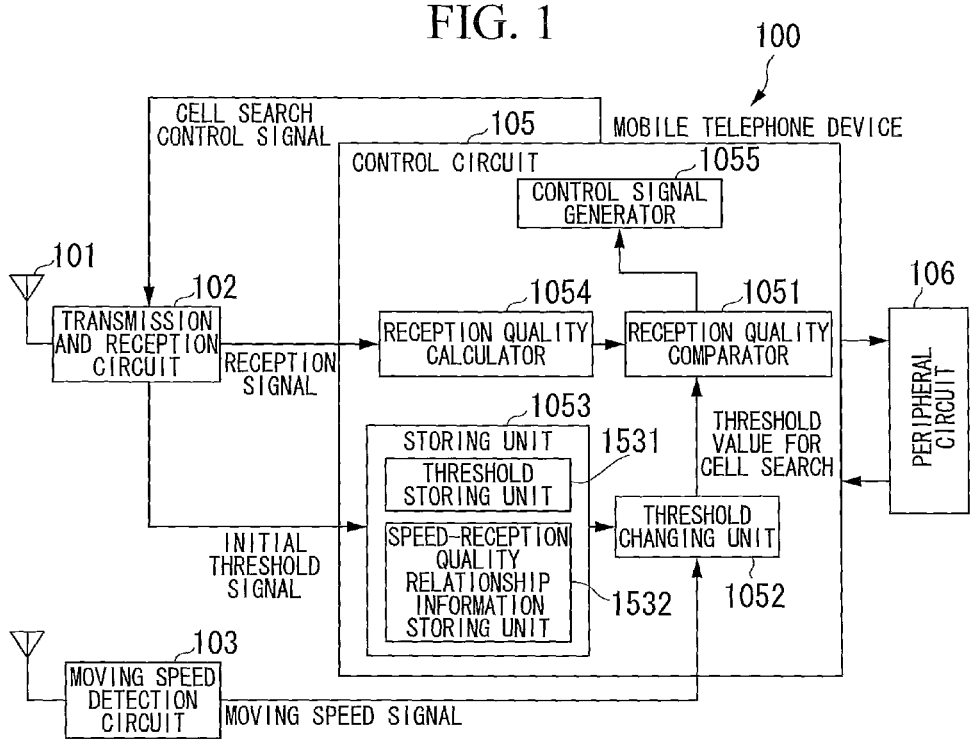

| MOVING SPEED [km/h] | AMOUNT OF CHANGE IN THRESHOLD VALUE FOR CELL SEARCH (VALUE TO BE SUBTRACTED) [dB], [dBm] |
|---|---|
| EQUAL TO OR MORE THAN 0 AND SMALLER THAN a' | 0 |
| EQUAL TO OR MORE THAN a' AND SMALLER THAN b' | x' |
| EQUAL TO OR MORE THAN b' AND SMALLER THAN c' | y' |
| ... | ... |

MOBILE STATION DEVICE, WIRELESS COMMUNICATION SYSTEM, MOBILE STATION DEVICE CONTROL METHOD, AND MOBILE STATION DEVICE CONTROL PROGRAM

TECHNICAL FIELD

The present invention relates to a mobile station device, a wireless communication system, a mobile station device control method, and a mobile station device control program.

Priority is claimed on Japanese Patent Application No. 2007-305857, filed Nov. 27, 2007, the content of which is incorporated herein by reference.

BACKGROUND ART

During mobile communication, a mobile station device in motion performs a search for a cell (hereinafter, "cell search") to communicate with a suitable base station device. Based on the result of the cell search, the mobile station device changes the base station device. Patent Document 1 discloses a mobile terminal that changes, based on a moving speed, a time interval at which the cell search is performed.

[Patent Document 1] Japanese Unexamined Patent First Publication No. 2006-246121

DISCLOSURE OF THE INVENTION

Problems to be Solved by the Invention

If the mobile station device is moving fast, however, a start of the cell search is delayed even if a time interval for the cell search is decreased. If the start of the cell search is delayed, the mobile station device does not have a sufficient time for changing a base station device. For this reason, the reception quality degrades before the base station device is changed, thereby causing a problem of a communication disconnected-or-disabled state of the mobile station device.

For example, when a cellular telephone handovers to a base station device performing communication using a different frequency, an operation of changing a reception frequency is delayed depending on a moving speed of the cellular telephone and a timing of a cell search, thereby causing the cellular telephone to be "out of coverage area."

The present invention is made in consideration of the above situations. An object of the present invention is to provide a mobile station device, a wireless communication system, a mobile station device control method, and a mobile station device control program, which can prevent the communication disabled state even when the mobile station device is moving fast, and can maintain the connection quality of the mobile station device.

Means for Solving the Problems (1) The present invention is made to solve the above problems. The present invention is a mobile station device that performs a cell search for searching a cell served by a base station device, and selects the base station device to be communicated with the mobile station device. The mobile station device includes: a moving speed detector that detects a moving speed of the mobile station device; a transmitting-and-receiving unit that receives a radio wave transmitted from the base station device, and initiates or terminates the cell search based on a cell-search control signal input to the transmitting-and-receiving unit; a reception quality calculator that calculates a reception quality value indicative of the quality of the radio wave received by the transmitting-and-receiving unit; a threshold storing unit that stores a threshold value for controlling the cell search; a changing unit that changes at least one of the threshold value and the reception quality value based on the moving speed detected by the moving speed detector; a reception quality comparator that performs at least one of a comparison between the reception quality value and the threshold value changed, a comparison between the reception quality value changed and the threshold value, and a comparison between the reception quality value changed and the threshold value changed; and a control signal generator that outputs the cell-search control signal to the transmitting-and-receiving unit based on a result of the comparison performed by the reception quality comparator.

Regarding the present invention, at least one of a comparison between the reception quality value and the threshold value changed, a comparison between the reception quality value changed and the threshold value, and a comparison between the reception quality value changed and the threshold value changed, is performed based on the moving speed of the mobile station device so as to effectively control execution of a cell search. Thus, for example, if the mobile station device is moving fast, a cell search can be initiated at an early stage before the channel quality value degrades.

Accordingly, the mobile station device suitably controls initiation of the cell search, and therefore has a sufficient time for a handover to another base station device, thereby preventing the communication disconnected-or-disabled state.

Additionally, if the channel quality value is high or if the mobile station device moves toward the base station device, the number of cell searches can be reduced. In this case, power consumption of the mobile station device and wastage of a battery can be reduced.

(2) Regarding the above mobile station device, the threshold value stored by the threshold storing unit is transmitted from the base station device.

(3) The above mobile station device further includes a speed-threshold relationship information storing unit that stores speed-threshold relationship information in which the moving speed is correlated to an amount of change in the threshold value. The changing unit refers to the speed-threshold relationship information, calculates an amount of change in the threshold value corresponding to the moving speed detected by the moving speed detector, and changes the threshold value by the amount of change.

(4) Regarding the above mobile station device, the speed-threshold relationship information storing unit stores the speed-threshold relationship information that the mobile station device has received from the base station device.

(5) Regarding the above mobile station device, the speed-threshold relationship information storing unit stores first speed-threshold relationship information that has been preliminarily stored and second speed-threshold relationship information that the mobile station device has received from the base station device. The changing unit changes the threshold value by using speed-threshold relationship information selected from the first speed-threshold relationship information and the second speed-threshold relationship information.

(6) Regarding the above mobile station device, the changing unit selects one of the first speed-threshold relationship information and the second speed-threshold relationship information based on information concerning a success rate of the cell search, and changes the threshold value using the selected one.

(7) The above mobile station device further includes a speed-reception quality relationship information storing unit that stores speed-reception quality relationship information in which the moving speed is correlated to an amount of change in the reception quality value. The changing unit refers to the speed-reception quality relationship information, calculates an amount of change in the reception quality value corresponding to the moving speed detected by the moving speed detector, and changes the reception quality value by the amount of change.

(8) Regarding the above mobile station device, the speed-reception quality relationship information storing unit stores the speed-reception quality relationship information that the mobile station device has received from the base station device.

(9) Regarding the above mobile station device, the speed-reception quality relationship information storing unit stores first speed-reception quality relationship information that has been preliminarily stored and second speed-reception quality relationship information that the mobile station device has received from the base station device. The changing unit changes the reception quality value by using speed-reception quality relationship information selected from the first speed-reception quality relationship information and the second speed-reception quality relationship information.

(10) Regarding the above mobile station device, the changing unit selects one of the first speed-reception quality relationship information and the second speed-reception quality relationship information based on information concerning a success rate of the cell search, and changes the reception quality value using the selected one.

(11) Regarding the above mobile station device, the changing unit changes the initial threshold value to a higher value as the moving speed increases.

(12) Regarding the above mobile station device, the changing unit changes the initial threshold value to a lower value as the moving speed increases.

(13) Regarding the above mobile station device, the changing unit changes at least one of the threshold value and the reception quality value when the moving speed exceeds a predetermined speed.

(14) The present invention is a wireless communication system including: a base station device; and a mobile station device that performs a cell search for searching a cell served by a base station device, and selects the base station device to be communicated with the mobile station device. The mobile station device includes: a moving speed detector that detects a moving speed of the mobile station device; a transmitting-and-receiving unit that receives a radio wave and a cell-search control signal which are transmitted from the base station device, transmits a reception quality value indicative of the quality of the radio wave and the moving speed detected by the moving speed detector to the base station device, and initiates or terminates the cell search based on the cell-search control signal input to the transmitting-and-receiving unit; a reception quality calculator that calculates the reception quality value of the radio wave received by the transmitting-and-receiving unit; a mobile station information transmitter that outputs the reception quality value calculated by the reception quality calculator and the moving speed detected by the moving speed detector to the transmitting-and-receiving unit. The base station device includes: a transmitting-and-receiving unit that receives the moving speed and the reception quality value from the mobile station device, and transmits the cell-search control signal to the mobile station device; a threshold storing unit that stores a threshold value for controlling the cell search; a changing unit that changes at least one of the threshold value and the reception quality value based on the moving speed detected by the moving speed detector; a reception quality comparator that performs at least one of a comparison between the reception quality value and the threshold value changed, a comparison between the reception quality value changed and the threshold value, and a comparison between the reception quality value changed and the threshold value changed; and a controller that outputs the cell-search control signal to the transmitting-and-receiving unit based on a result of the comparison performed by the reception quality comparator.

(15) The present invention is a method of controlling a mobile station device that performs a cell search for searching a cell served by a base station device, and selects the base station device to be communicated with the mobile station device. The method includes: a first step of detecting a moving speed of the mobile station device; a second step of receiving a radio wave transmitted from the base station device; a third step of calculating a reception quality value indicative of the quality of the radio wave received in the second step; a fourth step of changing at least one of the threshold value and the reception quality value based on the moving speed detected in the first step; a fifth step of performing at least one of a comparison between the reception quality value and the threshold value changed, a comparison between the reception quality value changed and the threshold value, and a comparison between the reception quality value changed and the threshold value changed; and a sixth step of initiating or terminating the cell search based on a result of the comparison performed in the fifth step.

(16) The present invention is a program that makes a computer of a mobile station device, which performs a cell search for searching a cell served by a base station device and selects the base station device to be communicated with the mobile station device, execute: a moving speed detector that detects a moving speed of the mobile station device; a receiving unit that receives a radio wave transmitted from the base station device; a reception quality calculator that calculates a reception quality value indicative of the quality of the radio wave received by the receiving unit; a changing unit that changes at least one of the threshold value and the reception quality value based on the moving speed detected by the moving speed detector; a reception quality comparator that performs at least one of a comparison between the reception quality value and the threshold value changed, a comparison between the reception quality value changed and the threshold value, and a comparison between the reception quality value changed and the threshold value changed; and a control signal generator that initiates or terminates the cell search based on a result of the comparison performed by the reception quality comparator.

Effects of the Invention

According to the present invention, the mobile station device compares the moving speed thereof and the quality of the received radio wave, and thereby can effectively control a cell search while the mobile station device is in motion. Accordingly, the mobile station device can maintain the connection quality and reduce wastage of a battery.

BRIEF DESCRIPTION OF THE DRAWINGS

FIG. 1 is a block diagram illustrating a mobile station device according to a first embodiment of the present invention.

FIG. 2 illustrates the relationship between a moving speed of a cellular telephone and the amount of change in a cell-search threshold value according to the first embodiment of the present invention.

Figure 3:
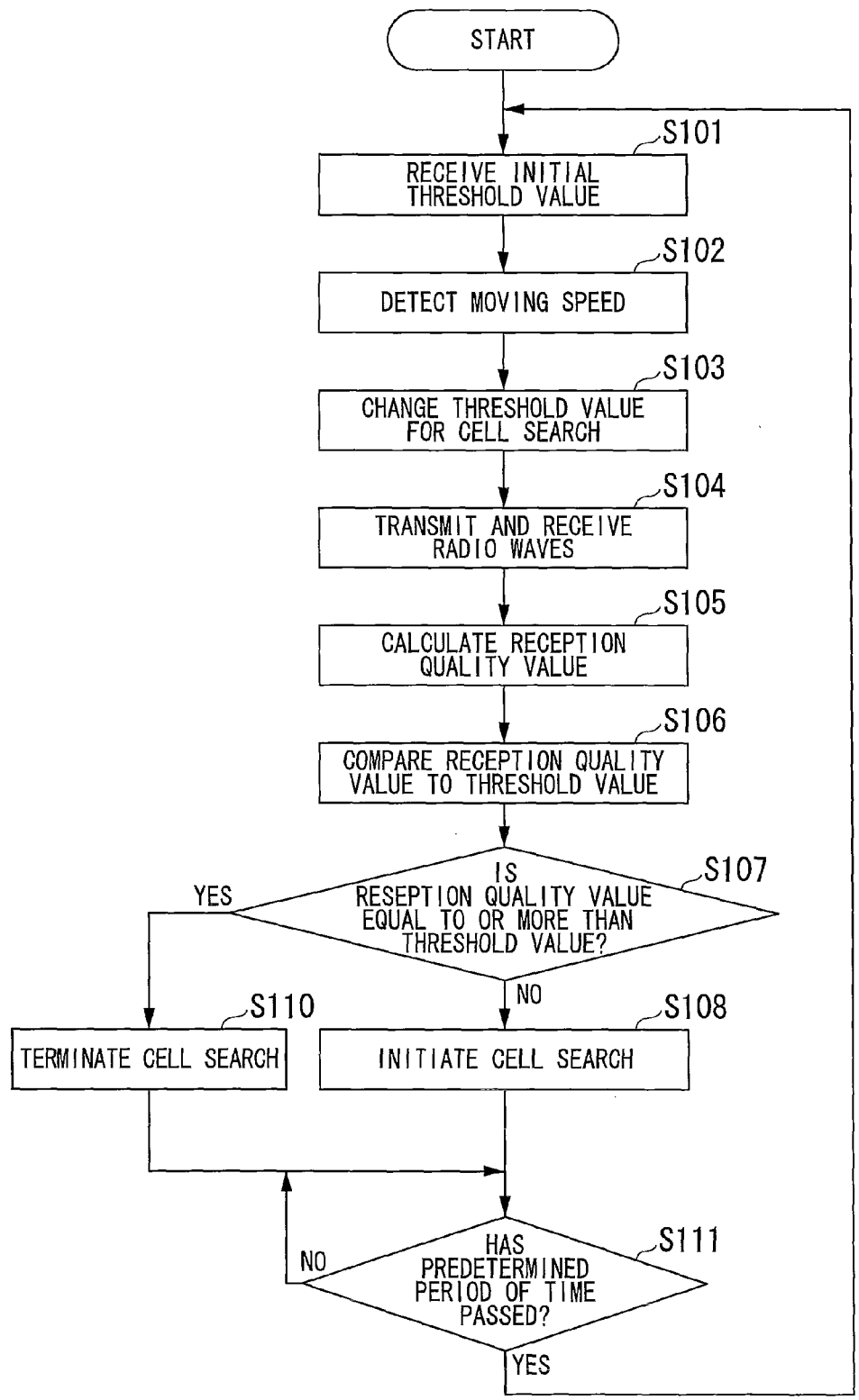
FIG. 3 is a flowchart according to the first embodiment of the present invention.

DESCRIPTION OF REFERENCE NUMERALS 100 cellular telephone device (mobile station device)
200 base station device
101 transmission-and-reception antenna
102 transmission-and-reception circuit
105 control circuit
106 peripheral circuit
1054 reception quality calculator
1053 storing unit
1052 threshold changing unit (changing unit)
1051 and 1071 reception quality comparator
1055 control signal generator
1531 threshold storing unit
1532 speed-threshold relationship information storing unit
1533 reception quality relationship information storing unit
1071 reception-quality changing unit (changing unit)
1057 mobile station information transmitter
201 transmission-and-reception antenna
202 transmission-and-reception circuit
205 control circuit
2051 reception quality comparator
2052 threshold changing unit
2053 storing unit
2531 threshold storing unit
2532 speed-threshold relationship information-storing unit

BEST MODE FOR CARRYING OUT THE INVENTION

First Embodiment

Hereinafter, embodiments of the present invention are explained in detail with reference to the accompanying drawings. FIG. 1 is a schematic block diagram illustrating a mobile station device of the present invention. As shown in FIG. 1, a cellular telephone 100 includes a transmission-and-reception antenna 101, a transmission-and-reception circuit 102, a moving-speed detection circuit 103, a control circuit 105, and a peripheral circuit 106.

The transmission-and-reception antenna 101 receives a radio wave transmitted from a base station device at a predetermined gain in a frequency band used by the cellular telephone 100. Additionally, the transmission-and-reception antenna 101 transmits a radio wave to the base station device.

The transmission-and-reception circuit 102 receives as an electric signal, a radio wave transmitted from the base station device through the transmission-and-reception antenna 101, and amplifies the reception signal up to a predetermined power. Then, the transmission-and-reception circuit 102 converts the amplified reception signal into a baseband signal, and outputs the converted baseband signal to the control circuit 105.

The transmission-and-reception circuit 102 converts a baseband signal received from the control circuit 105 into a radio-frequency transmission signal. Then, the transmission-and-reception circuit 102 amplifies the transmission signal up to a predetermined power, and transmits as a radio wave, the amplified transmission signal to the base station device through the transmission-and-reception antenna 101. The transmission-and-reception circuit 102 initiates or terminates a cell search based on a cell-search control signal received from the control circuit 105.

The moving-speed detection circuit 103 detects a moving speed of the cellular telephone 100. For example, the moving-speed detection circuit 103 estimates the maximum Doppler frequency of the reception signal, and thus detects a moving speed of the cellular telephone 100 based on the estimated Doppler frequency. If the cellular telephone has the GPS (Global Positioning System) function, the moving-speed detection circuit 103 measures a position of the cellular telephone using the GPS, and detects a moving speed of the cellular telephone 100 based on the displacement of the measured position per unit time. Then, the moving-speed detection circuit 103 outputs information concerning the detected moving speed of the cellular telephone 100 to the control circuit 105.

The control circuit 105 controls a cell search based on the information received from the transmission-and-reception circuit 102 and the moving-speed detection circuit 103. The control circuit 105 includes a reception quality comparator 1051, a threshold changing unit 1052, a storing unit 1053, a reception quality calculator 1054, and a control signal generator 1055.

The reception quality calculator 1054 calculates a reception quality value indicative of the quality of the received radio wave based on the baseband signal received from the transmission-and-reception circuit 102, and then outputs the calculated reception quality value to the reception quality comparator 1051. In a W-CDMA (Wideband Code Division Multiple Access) communication system, for example, RSCP (Received Signal Code Power) of CPICH (Common Pilot Channel), Path Loss (path attenuation), or Ec/Io (signal strength to entire reception signal strength) may be used as the reception quality value.

The threshold changing unit 1052 calculates a threshold value (hereinafter, "cell-search threshold value") of a reception quality value, at which a cell search is initiated, based on the moving speed of the cellular telephone 100 received from the moving-speed detection circuit 103, and then outputs the cell-search threshold value to the reception quality comparator 1051.

The storing unit 1053 includes a threshold storing unit 1531 and a speed-threshold relationship information storing unit 1532. The speed-threshold relationship information storing unit 1532 stores information concerning the relationship between the moving speed and the amount of change in the cell-search threshold value (hereinafter, "speed-threshold relationship information"). The threshold storing unit 1531 stores a reference threshold value preliminarily transmitted from the base station device (hereinafter, "initial threshold value").

The threshold changing unit 1052 refers to the speed-threshold relationship information received from the speed-threshold relationship information storing unit 1532, and calculates the amount of change in the cell-search threshold value corresponding to the moving speed of the cellular telephone 100 received from the moving-speed detection circuit 103. Then, the threshold changing unit 1052 changes the initial threshold value received from the threshold storing unit 1531 by the calculated amount, and sets the result to the cell-search threshold value.

Hereinafter, a specific method of calculating the cell-search threshold value is explained with reference to FIG. 2. FIG. 2 is a table illustrating the speed-threshold relationship information concerning the cellular telephone 100. In FIG. 2, the amount to be added to the cell-search threshold value is correlated to a predetermined speed. It is assumed here that $0<a<b<c\ldots$, and $0<x<y<\ldots$. The speed-threshold relationship information concerning cellular telephone 100 is preliminarily calculated by a preliminary simulation or a field test.

The threshold changing unit 1052 calculates the cell-search threshold value based on the table shown in FIG. 2. For example, when the cellular telephone 100 is moving at the speed that is less than a km/h, the amount to be added to the cell-search threshold value is 0 dB. Therefore, the cell-search threshold value does not change by addition, and is the same as the initial threshold value. When the cellular telephone 100 is moving at the speed that is equal to or more than a km/h and less than b km/h, the amount to be added to the cell-search threshold value is x dB. Therefore, x dB is added to the cell-search threshold value, and the cell-search threshold value becomes x dB greater than the initial threshold value. When the cellular telephone 100 is moving at the speed that is equal to or more than b km/h and less than c km/h, the amount to be added to the cell-search threshold value is y dB. Based on the type of the reception quality, the amount to be added to the cell-search threshold value becomes x dBm (with 1 mW as reference power) or y dBm.

The reception quality comparator 1051 compares the cell-search threshold value received from the threshold changing unit 1052 to the reception quality value received from the reception quality calculator 1054, and then outputs the comparison result to the control signal generator 1055.

The control signal generator 1055 outputs a cell-search control signal to the transmission-and-reception circuit 102 based on the comparison result received from the reception quality comparator 1051. Specifically, the control signal generator 1055 outputs a cell-search control signal for initiating a cell search to the transmission-and-reception circuit 102 if the reception quality value is smaller than the cell-search threshold value as a result of comparing the reception quality value to the cell-search threshold value. On the other hand, the control signal generator 1055 outputs a cell-search control signal for terminating a cell search to the transmission-and-reception circuit 102 if the reception quality value is greater than the cell-search threshold value as a result of comparing the reception quality value to the cell-search threshold value.

If the cell-search control signal for initiating a cell search is received, the transmission-and-reception circuit 102 initiates a cell search, and periodically initiates the cell search at a predetermined interval of time. If the cell-search control signal for terminating a cell search is received, the transmission-and-reception circuit 102 terminates the cell search and maintains the terminated state.

Additionally, the peripheral circuit 106, the control circuit 105, and the transmission-and-reception circuit 102 have general functions of a cellular telephone.

The peripheral circuit 106 includes various types of circuits that control a display unit, a speaker, or the like. For example, the peripheral circuit 106 demodulates and decodes an audio signal received from the control circuit 105, and has a speaker of a telephone receiver output audio. Additionally, the peripheral circuit 106 encodes and modulates audio received from a microphone of a telephone transmitter, and outputs an audio signal to the control circuit 105. Further, the peripheral circuit 106 has the display unit display various information items based on an instruction from the control circuit 105. Although one peripheral circuit 106 is illustrated in FIG. 1, multiple peripheral circuits may be included. Then, the control circuit 105 processes the input signal and outputs the processed signal to the peripheral circuit 106 and the transmission-and-reception circuit 102. For example, the control circuit 105 converts the baseband signal received from the transmission-and-reception circuit 102 into an audio signal, and outputs the audio signal to the peripheral circuit 106. Additionally, the control circuit 105 converts an audio signal received from the peripheral circuit 106 into a baseband signal, and outputs the baseband signal to the transmission-and-reception circuit 102.

Hereinafter, an operation of the cellular telephone 100 according to the first embodiment is explained. FIG. 3 is a flowchart illustrating the operation of the first embodiment. The threshold storing unit 1531 included in the storing unit 1053 preliminarily obtains the initial threshold value through the transmission-and-reception antenna 101 and the transmission-and-reception circuit 102, and stores the obtained initial threshold value (S101).

First, the moving-speed detection circuit 103 detects a moving speed of its own cellular telephone (S102), and outputs the detected moving speed to the threshold changing unit 1052. The threshold changing unit 1052 refers to the speed-threshold relationship information obtained from the speed-threshold relationship information storing unit 1532, and then calculates the amount of change in the cell-search threshold value corresponding to the moving speed of the cellular telephone 100 received from the moving-speed detection circuit 103. Then, the threshold changing unit 1052 changes the initial threshold value received from the threshold storing unit 1531 by the calculated amount of change, and outputs the resultant cell-search threshold value to the reception quality comparator 1051 (S103).

On the other hand, the transmission-and-reception circuit 102 receives a radio wave from the base station device, converts the radio wave into an electric signal (S104), and outputs the electric signal to the reception quality calculator 1054. Then, the reception quality calculator 1054 calculates a reception quality value based on the signal received from the transmission-and-reception circuit 102 (S105), and outputs the reception quality value to the reception quality comparator 1051.

The reception quality comparator 1051 compares the cell-search threshold value received from the threshold changing unit 1052 to the reception quality value received from the reception quality calculator 1054 (S106), and determines whether or not the reception quality value is equal to or greater than the cell-search threshold value (S107). If the reception quality value is smaller than the cell-search threshold value, the control circuit 105 outputs the cell-search control signal for initiating the cell search to the transmission-and-reception circuit 102, and the transmission-and-reception circuit 102 initiates the cell search (S108). On the other hand, if the reception quality value is equal to or greater than the cell-search threshold value, the control circuit 105 outputs the cell-search control signal for terminating the cell search to the transmission-and-reception circuit 102, and the transmission-and-reception circuit 102 terminates the cell search (S110).

The above operation repeats at a predetermined interval of time (S111).

Figure 4:
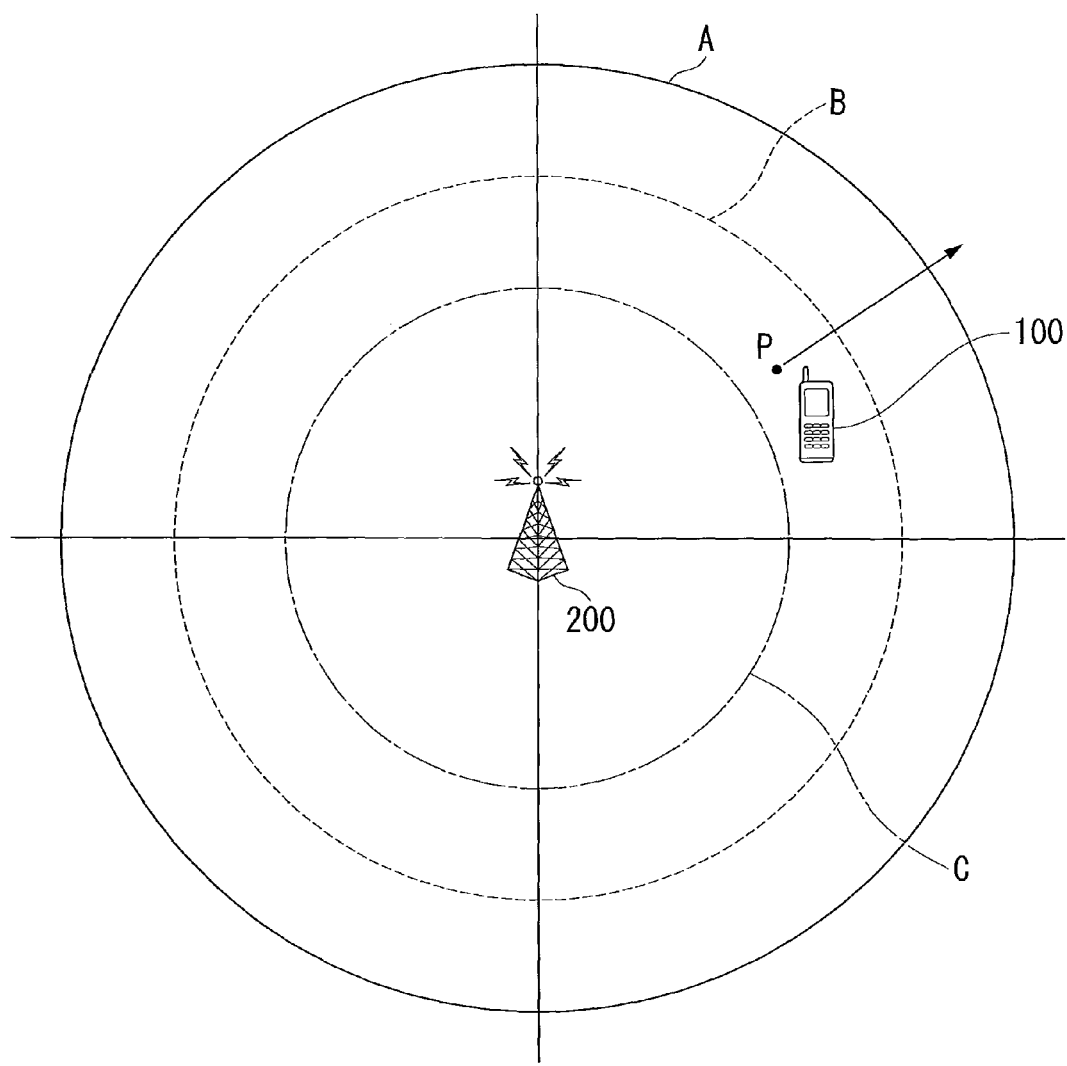
FIG. 4 illustrates threshold equivalent points based on the positional relationship between the base station device and the cellular telephone, and the moving speed of the cellular telephone according to the first embodiment of the present invention.

Hereinafter, the relationship between the reception quality value of the cellular telephone 100 and the presence-or-absence of a cell search is explained with reference to FIG. 4. FIG. 4 illustrates the positional relationship between the base station device 200 and the cellular telephone 100. The base station device 200 equally transmits a communication wave toward all directions. Since the communication wave further attenuates as the distance from the base station device 200 becomes greater, a point A indicates the limit point within which communication can be performed. A point P indicates the position of the cellular telephone 100. An arrow extending from the point P indicates the direction in which the cellular telephone 100 moves. In FIG. 4, the cellular telephone 100 is moving toward a direction away from the base station device 200.

First, a point where the reception quality value equates the cell-search threshold value (hereinafter, "threshold equivalent point") is shown for each value of the moving speed of the cellular telephone 100.

When the cellular telephone 100 is moving slowly, for example, at the speed that is less than a km/h, the threshold equivalent point is defined as a point B. When the cellular telephone 100 is moving fast, for example, at the speed that is equal to or more than a km/h and less than b km/h, x dB is added to the cell-search threshold value, and therefore the resultant cell-search threshold value is greater than in the case of the moving speed being less than a km/h. Since the cell-search threshold value is greater than in the case of the moving speed being less than a km/h, a point where the reception quality value is higher than that of the point B, i.e., a point C where the attenuation degree of a communication wave transmitted from the base station device 200, and which is closer to the base station device 200, is the threshold equivalent point. Further, when the moving speed of the cellular telephone 100 becomes equal to or more than b km/h and less than c km/h, the amount to be added to the cell-search threshold value increases. Therefore, the threshold equivalent point becomes closer to the base station device 200 than the point C in a similar manner.

As a result, as the moving speed of the cellular telephone 100 increases, the threshold equivalent point becomes closer to the base station device 200.

Hereinafter, the relationship between the threshold equivalent point and presence-or-absence of a cell search is explained.

At a point that is further from the base station device 200 than the threshold equivalent point, the reception quality value is smaller than the cell-search threshold value due to attenuation of communication waves. Therefore, the cellular telephone 100 initiates a cell search. On the other hand, at a point closer to the base station device 200 than the threshold equivalent point, the reception quality value is greater than the cell-search threshold value. The cellular telephone 100 terminates the cell search.

Consequently, the cellular telephone 100 initiates the cell search at a point outside a circle formed by a set of threshold equivalent points defined with the base station device as the center, and terminates the cell search at a point inside the circle.

Accordingly, the relationship among the reception quality of the cellular telephone 100, the moving speed, and the presence-or-absence of a cell search becomes as follows.

When the cellular telephone 100 moves away from the base station device 200, as the moving speed of the cellular telephone 100 increases, the cellular telephone 100 initiates the cell search at a point closer to the base station device 200 having high reception quality value.

At a point where reception quality value is high, compared to a point where reception quality value is low, the cellular telephone 100 terminates the cell search even if the moving speed thereof is large.

On the other hand, if the cellular telephone 100 initiates the cell search irrespective of the moving speed thereof, the cell search is not initiated though the cellular telephone is moving fast. Particularly when the cellular telephone 100 is moving away from the base station device 200 and is moving fast around the boundary of the point A, the cellular telephone 100 cannot perform in time, a handover to a new base station device found by the cell search. Consequently, the cellular telephone 100 cannot communicate with the new base station device even when the cellular telephone 100 moves over the point A, and therefore is "out of coverage area."

To prevent the cellular telephone 100 from being "out of the coverage area," it is necessary to have a sufficient time for the handover to the new base station device. As the moving speed of the cellular telephone 100 increases, the cellular telephone 100 is required to initiate the cell search at a point closer to the base station device 200 having high reception quality value. In the first embodiment, the cellular telephone 100 initiates the cell search at a point closer to the base station device 200 radiating strong electric waves as the moving speed of the cellular telephone 100 increases. Thus, the cellular telephone 100 can have a sufficient time for the cell search, and thereby can be prevented from being "out of the coverage area."

If it is assumed that the cellular telephone 100 initiates the cell search based on the moving speed thereof and not on the reception quality value, when the moving speed becomes the predetermined speed even if the cellular telephone 100 is located at a point where the reception quality is high, the cellular telephone 100 initiates the cell search and thus consumes power. In the first embodiment, even if the moving speed is large, the cellular telephone 100 terminates the cell search at a point where the reception quality is high, compared to a point where the reception quality is low. Since the cell search is terminated, the cellular telephone 100 can reduce wasteful power consumption required for the cell search, and thereby reduce wastage of battery.

Second Embodiment

Figures 5, 6:
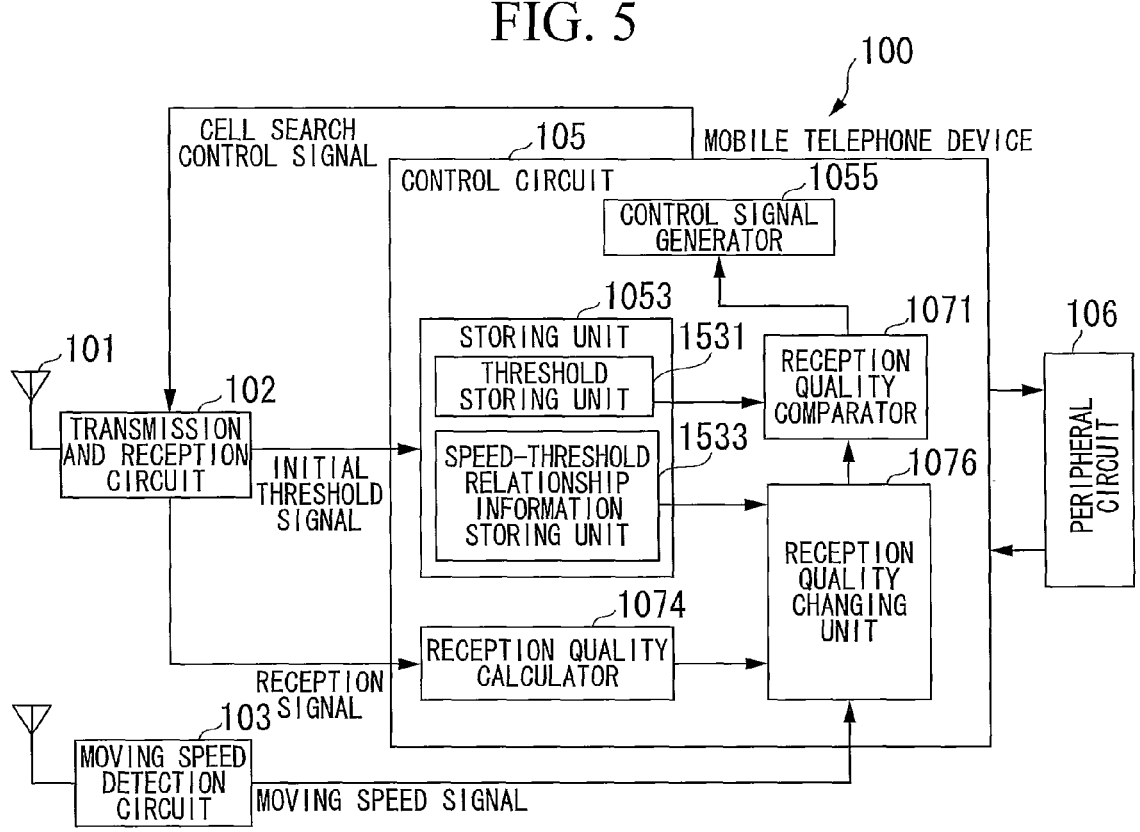
FIG. 5 is a block diagram illustrating a mobile station device according to a second embodiment of the present invention.
FIG. 6 illustrates the relationship between a moving speed of a cellular telephone and the amount of change in a cell-search threshold value according to the second embodiment of the present invention.

Hereinafter, a second embodiment of the present invention is explained with reference to the accompanying drawings. FIG. 5 is a schematic block diagram illustrating a cellular telephone 100 that is a mobile station device according to the second embodiment of the present invention. As shown in FIG. 5, the cellular telephone 100 includes the transmission-and-reception antenna 101, the transmission-and-reception circuit 102, the mobile-speed detection circuit 103, the control circuit 105, and the peripheral circuit 106.

The first embodiment has explained the case where the threshold value for determining the reception quality value is changed based on the speed of the cellular telephone 100. However, the second embodiment explains a case where the reception quality value is changed. In other words, in the first embodiment, the threshold value is changed, and then the changed threshold value is compared to the reception quality value. On the other hand, in the second embodiment, a reception-quality changing unit 1076 apparently changes the reception quality value, and the changed reception quality value is compared to the initial threshold value that is a fixed threshold value.

The differences from the first embodiment are a reception quality comparator 1071, a reception quality calculator 1074, and a reception-quality changing unit 1076, which are included in the control circuit 105. Therefore, explanation of the same functions as those explained in the first embodiment is omitted here.

The reception quality calculator 1074 calculates a reception quality value based on the baseband signal received from the transmission-and-reception circuit 102, and outputs the reception quality value to the reception-quality changing unit 1076.

Based on the moving speed of the cellular telephone 100 received from the moving-speed detection circuit 103, the reception-quality changing unit 1076 changes the reception quality value calculated by the reception quality calculator 1074, and outputs the changed reception quality value to the reception quality comparator 1071. The reception-quality changing unit 1076 refers to speed-reception quality relationship information received from the speed-reception channel relationship information storing unit 1533 included in the storing unit 1053, and calculates an amount of change in the reception quality value corresponding to the moving speed of the cellular telephone 100 received from the moving-speed detection circuit 103. Then, the reception-quality changing unit 1076 changes the reception quality value received from the reception quality calculator 1074 by the calculated amount of change, and sets the result to the reception quality value.

Hereinafter, a specific calculation method is explained with reference to FIG. 6. FIG. 6 is a table illustrating a function of changing a reception quality level at which a cell search is initiated based on the moving speed of the cellular telephone. As shown in FIG. 6, an amount to be subtracted from the reception quality value is correlated to a predetermined speed where 0<a'<b'<c' . . . and 0<x'<y'< . . . .

Based on the table shown in FIG. 6, the reception quality calculator 1074 calculates reception quality value. For example, if the cellular telephone is moving at the speed that is less than a' km/h, the amount to be subtracted from the reception quality value is 0 dB. Therefore, no value is added to the reception quality value, and then the reception quality value received from the reception quality calculator 1074 does not change. Then, if the cellular telephone is moving at the speed that is equal to or more than a' km/h and less than b' km/h, an amount to be subtracted from the reception quality value is x' dB. Therefore, x' dB is subtracted from the reception quality value received from the reception quality calculator 1074. If the cellular telephone is moving at the speed that is equal to or more than b' km/h and less than c' km/h, the amount to be subtracted from the reception quality value for the cell search is y' dB. Based on the type of reception quality value, an amount to be subtracted from the reception quality value for the cell search becomes x' or y' dBm.

The reception quality comparator 1071 compares the cell-search threshold value (initial threshold value) received from the threshold storing unit 1531 included in the storing unit 1053 to the reception quality value received from the reception-quality changing unit 1076, and outputs the result to the control signal generator 1055.

Based on the comparison result received from the reception quality comparator 1071, the control signal generator 1055 outputs a cell-search control signal to the transmission-and-reception circuit 102. Specifically, the control signal generator 1055 outputs the cell-search control signal for initiating the cell search to the transmission-and-reception circuit 102 if the reception quality value is smaller than the cell-search threshold value. On the other hand, the control signal generator 1055 outputs the cell control signal for terminating the cell search to the transmission-and-reception circuit 102 if the reception quality value is greater than the cell-search threshold value.

Thus, the same effect as that of the first embodiment can be achieved.

Figure 7:
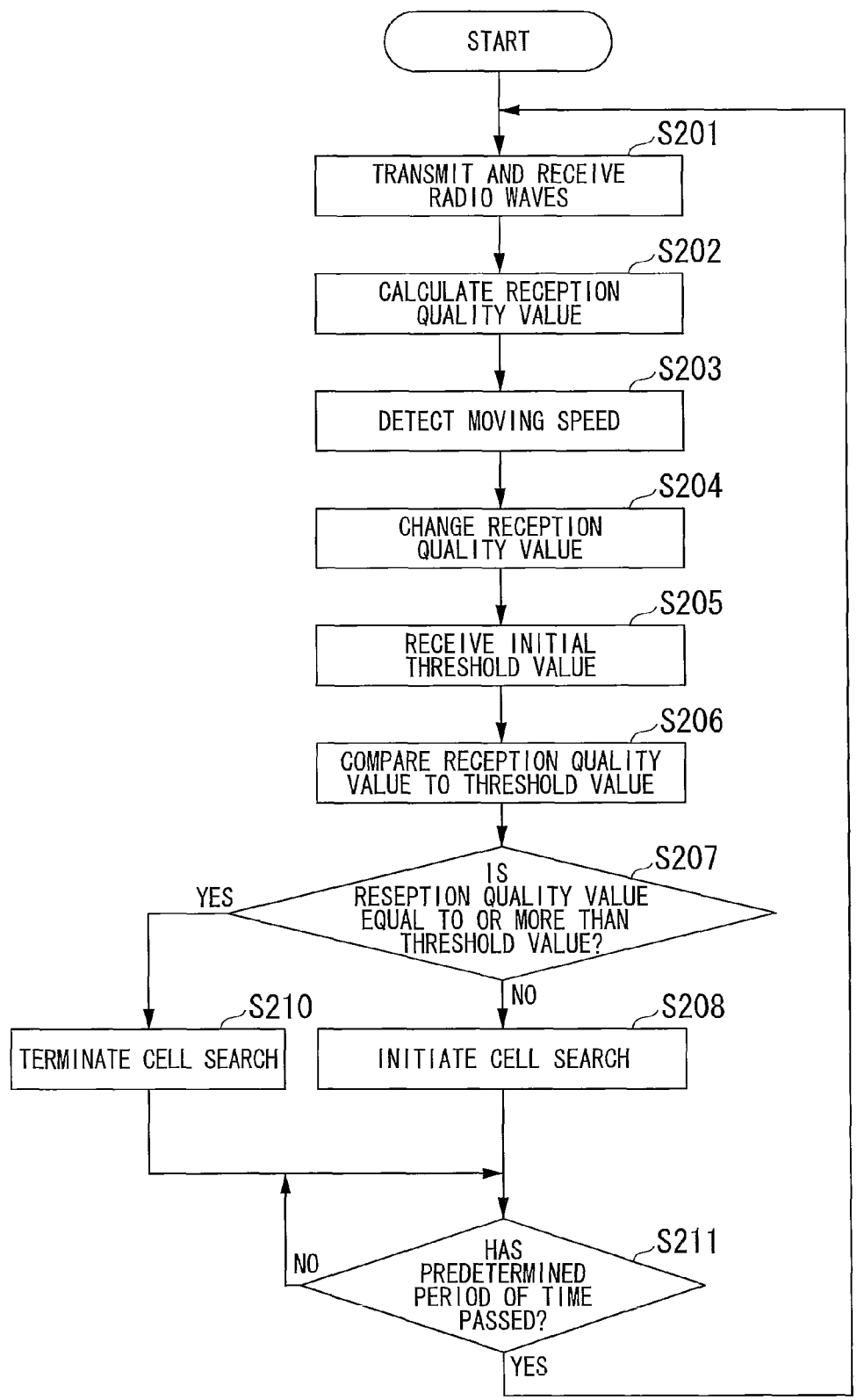
FIG. 7 is a flowchart according to the second embodiment of the present invention.

Hereinafter, an operation of the cellular telephone 100 according to the second embodiment is explained. FIG. 7 is a flowchart illustrating the operation according to the second embodiment.

First, the transmission-and-reception circuit 102 receives a radio wave from the base station device and converts the radio wave into a signal (S201), and outputs the signal to the reception quality calculator 1074. Then, the reception quality calculator 1074 calculates a reception quality value based on the signal received from the transmission-and-reception circuit 102 (S202), and outputs the result to the reception-quality changing unit 1076.

On the other hand, the moving-speed detection circuit 103 calculates a moving speed of its own cellular telephone (S203), and outputs the result to the reception-quality changing unit 1076. Then, the reception-quality changing unit 1076 changes the reception quality value based on the moving speed received from the moving-speed detection circuit 103 and the reception quality value received from the reception quality calculator 1074, and outputs the changed reception quality value to the reception quality comparator 1071 (S204).

The reception quality comparator 1071 compares the reception quality value received from the reception-quality changing unit 1076 to the cell-search threshold value (initial threshold value) received from the threshold storing unit 1531 (S206), and determines whether or not the reception quality value is equal to or greater than the threshold value (S207). If the reception quality value is smaller than the cell-search threshold value, the control circuit 105 outputs the cell-search control signal for initiating the cell search to the transmission-and-reception circuit 102. Then, the transmission-and-reception circuit 102 initiates the cell search (S208).

On the other hand, if the reception quality value is greater than the threshold value, the control circuit 105 outputs the cell-search control signal for terminating the cell search to the transmission-and-reception circuit 102. Then, the transmission-and-reception circuit 102 terminates the cell search (S210).

Then, the above operation repeats at a predetermined interval of time (S211).

In the second embodiment, the present invention can be performed without changing the initial threshold value.

Third Embodiment

Figure 8:
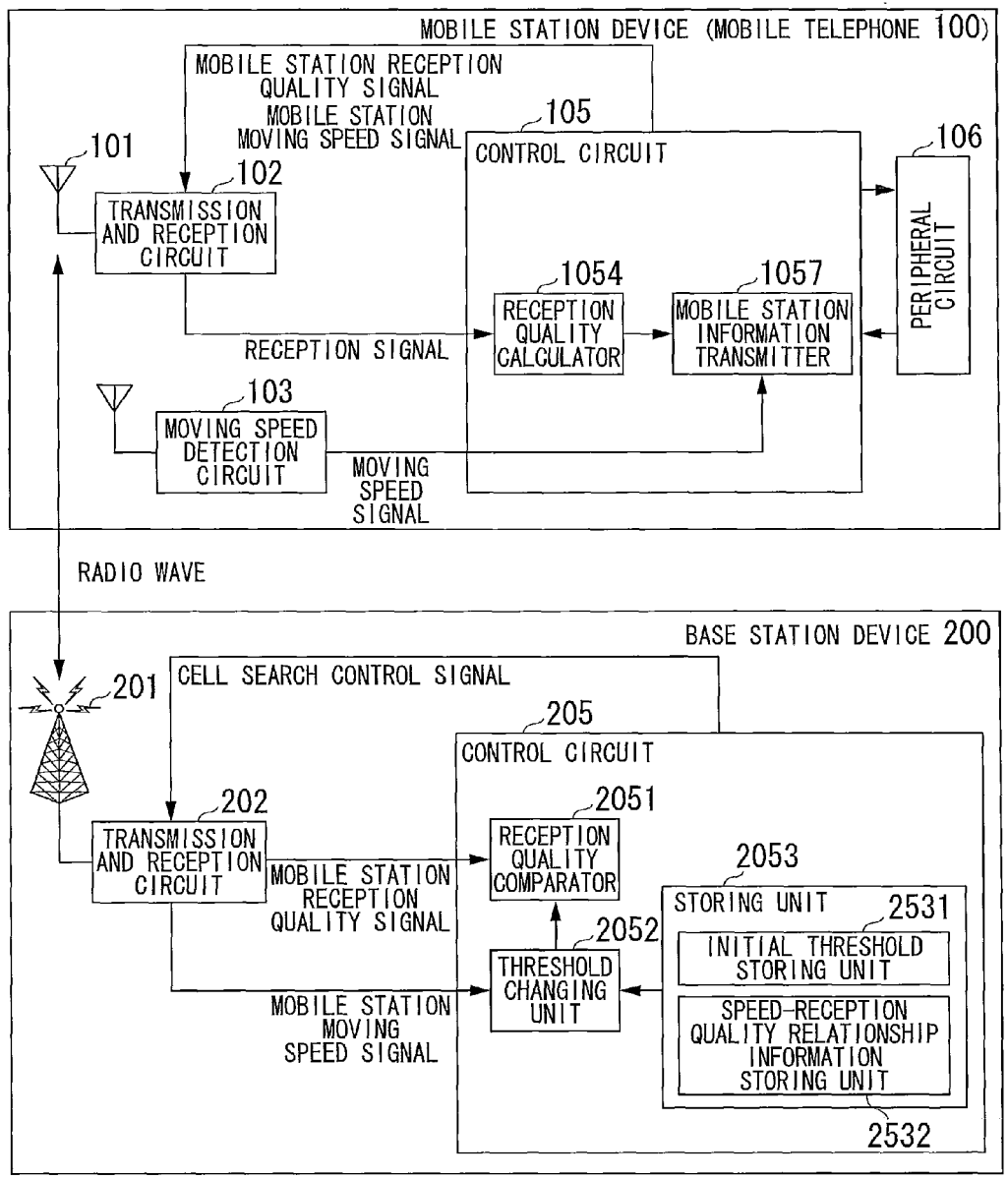
FIG. 8 is a block diagram illustrating a mobile station device and a base station device according to a third embodiment of the present invention.

Hereinafter, a third embodiment of the present invention is explained with reference to the accompanying drawings. FIG. 8 is a schematic block diagram illustrating a wireless communication system including the cellular telephone 100 that is a mobile station device and a base station device 200, according to the third embodiment of the present invention. As shown in FIG. 8, the cellular telephone 100 includes the transmission-and-reception antenna 101, the transmission-and-reception circuit 102, the mobile-speed detection circuit 103, the control circuit 105, and the peripheral circuit 106. The base station device 200 includes a transmission-and-reception antenna 201, a transmission-and-reception circuit 202, and a control circuit 205.

The third embodiment explains a case where the base station device has the functions of the threshold changing unit, the reception quality comparator, and the storing unit, which are included in the mobile station device of the first embodiment.

The transmission-and-reception antenna 101, the transmission-and-reception circuit 102, and the moving-speed detection circuit 103 are the same as those in the first embodiment.

The control circuit 105 includes a reception quality calculator 1054 and a mobile station information transmitter 1057.

The reception quality calculator 1054 calculates a reception quality value based on the baseband signal received from the transmission-and-reception circuit 102, and outputs the result to the mobile station information transmitter 1057. The mobile station information transmitter 1057 sets the reception quality value received from the reception quality calculator 105 and the moving speed received from the moving-speed detection circuit 103 to the mobile-station reception quality signal and the mobile-station moving-speed signal, and outputs these signals to the transmission-and-reception circuit 102.

The transmission-and-reception circuit 102 transmits the mobile-station moving-speed signal and the mobile-station reception quality signal, which are received from the control circuit 105, to the base station device 200 through the transmission-and-reception antenna 101.

The transmission-and-reception antenna 201 receives a radio wave from the cellular telephone 100 at a predetermined gain in a predetermined frequency band, and transmits the radio wave to the cellular telephone 100.

The transmission-and-reception circuit 202 receives through the transmission-and-reception antenna 201, the radio wave transmitted from the cellular telephone 100 as an electric signal. Then, the transmission-and-reception circuit 202 amplifies the reception signal up to a predetermined power. Then, the transmission-and-reception circuit 202 converts the amplified reception signal into a baseband signal, and outputs the converted baseband signal to the control circuit 205.

The transmission-and-reception circuit 202 converts the baseband signal received from the control circuit 205 into a radio-frequency transmission signal. Then, the transmission-and-reception circuit 202 amplifies the transmission signal up to a predetermined power, and transmits the amplified transmission signal to the cellular telephone 100 through the transmission-and-reception antenna 201.

The control circuit 205 controls the cell search based on the information received from the transmission-and-reception circuit 202. The control circuit 205 includes a reception quality comparator 2051, a threshold changing unit 2052, and a storing unit 2053.

The threshold changing unit 2052 calculates a cell-search threshold value based on the moving speed of the mobile station device received from the transmission-and-reception circuit 202, and outputs the cell-search threshold value to the reception quality comparator 2051.

The speed-threshold relationship information storing unit 2532 included in the storing unit 2053 preliminarily stores speed-threshold relationship information. The threshold storing unit 2531 stores an initial threshold value. The threshold changing unit 2052 refers to the speed-threshold relationship information received from the speed-threshold relationship information storing unit 2532, and calculates an amount of change in the cell-search threshold value correlated to the moving speed of the mobile station device received from the transmission-and-reception circuit 202. Then, the threshold changing unit 2052 changes the initial threshold value received from the threshold storing unit 2531 by the calculated amount of change, and sets the result to the cell-search threshold value.

A specific calculation method is the same as that used by the threshold changing unit 1052 of the first embodiment.

The reception quality comparator 2051 compares the cell-search threshold value received from the threshold changing unit 2052 and the reception quality value of the mobile station device received from the transmission-and-reception circuit 202. Then, the reception quality comparator 2051 outputs the comparison result to the transmission-and-reception circuit 202 as a cell-search control signal. The relationship between the comparison result and the cell-search control signal is the same as that between the results of the comparison performed by the control signal generator 1055 of the first embodiment and the cell-search control signal.

Figure 9:
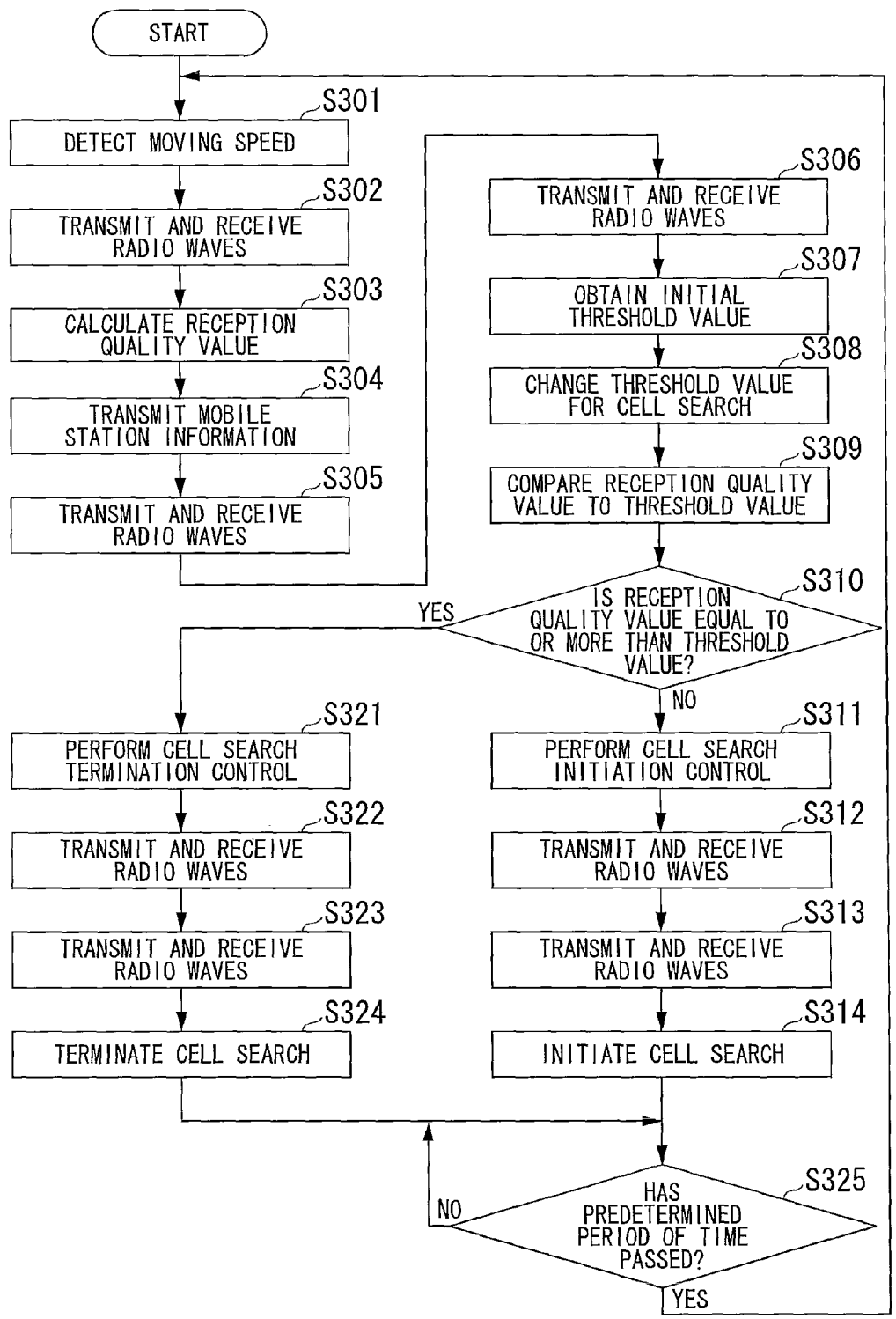
FIG. 9 is a flowchart according to the third embodiment of the present invention.

Hereinafter, operations of the cellular telephone 100 and the base station device 200 of the third embodiment are explained. FIG. 9 is a flowchart illustrating the operations according to the third embodiment.

First, the moving-speed detection circuit 103 detects a moving speed of its own cellular telephone (S301), and outputs the moving speed to the mobile station information transmitter 1057. On the other hand, the transmission-and-reception circuit 102 receives a radio wave, converts the radio wave into a signal (S302), and outputs the signal to the reception quality calculator 1054. Then, the reception quality calculator 1054 calculates a reception quality value based on the signal received from the transmission-and-reception circuit 102 (S303), and outputs the reception quality value to the mobile station information transmitter 1057.

Further, the mobile station information transmitter 1057 sets the moving speed received from the moving-speed detection circuit 103 to a mobile station moving speed signal, and sets the reception quality value received from the reception quality calculator 1054 to a mobile station reception quality signal. Then, the mobile station information transmitter 1057 outputs these signals to the transmission-and-reception circuit 102 (S304). The transmission-and-reception circuit 102 transmits as a radio wave, the mobile station moving speed signal and the mobile station reception quality signal to the base station device 200 through the transmission-and-reception antenna 101 (S305).

The transmission-and-reception antenna 201 of the base station device receives the radio wave transmitted from the transmission-and-reception antenna 101 (S306). The transmission-and-reception circuit 202 obtains the mobile station moving speed signal and the mobile station reception quality signal, and outputs these signals to the control circuit 205. The threshold changing unit 2052 included in the control circuit 205 obtains the speed threshold relationship information and the initial threshold value, which are preliminarily stored in the storing unit 2053 (S307).

The threshold changing unit 2052 refers to the speed-threshold relationship information obtained from the speed-threshold relationship information storing unit 2532, and calculates an amount of change in the cell-search threshold value correlated to the moving speed of the mobile station device received from the transmission-and-reception circuit 202. Then, the threshold changing unit 2052 changes the initial threshold value received from the threshold storing unit 2531 by the calculated amount of change, and outputs the resultant cell-search threshold value to the reception quality comparator 2051 (S308).

The reception quality comparator 2051 compares the reception quality value of the mobile station device received from the transmission-and-reception circuit 202 to the cell-search threshold value received from the threshold changing unit 2052 (S309). Then, the reception quality comparator 2051 determines whether or not the reception quality value is greater than the threshold value (S310).

If the reception quality value is smaller than the cell-search threshold value, the control circuit 205 outputs a cell-search control signal for initiating the cell search to the transmission-and-reception circuit 202 (S311). On the other hand, if reception quality value is greater than the cell-search threshold value, the control circuit 205 outputs a cell search control signal for terminating the cell search to the transmission-and-reception circuit 202 (S321). The transmission-and-reception circuit 202 transmits a radio wave to the mobile station device through the transmission-and-reception antenna 201 (S312 and S322).

The transmission-and-reception antenna 101 of the cellular telephone 100 receives the radio wave transmitted from the transmission-and-reception antenna 201 (S313 and S323). Then, the transmission-and-reception circuit 102 obtains the cell-search control signal, and initiates the cell search if the signal is the control signal for initiating the cell search (S314).

On the other hand, the transmission-and-reception circuit 102 terminates the cell search if the signal is the control signal for terminating the cell search (S324).

Then, the above operation repeats at a predetermined period of time (S325).

In the third embodiment, a program for comparing the reception quality value and threshold value can be added or changed in the base station device 200 without loading the program into the cellular telephone 100.

Although the third embodiment has been explained in detail, for example, the configuration of the second embodiment, in which the reception quality value is changed by subtraction, and the changed reception quality value is compared to the cell-search threshold value, may be used.

Regarding each of the embodiments, the relationship between the point at which the cell search is initiated, i.e., the cell-search threshold value, and the moving speed is not limited to that shown in the embodiment as long as the cellular telephone stays in the communication area at the time the cell search is terminated. The relationship may be accordingly set based on the actual size of the communication area of the base station device, a time required for the cell search, and a moving speed of the cellular telephone.

Although the first embodiment has explained the case where a value is added to the cell-search threshold value under the condition that $0<x<y<\ldots$ for $0<a<b<c<\ldots$, the present invention is not limited thereto. For example, when it is assumed in FIG. 2 that the change amount $\alpha 0$ is correlated to the moving speed that is equal to or more than 0 km/h and smaller than 1 km/h, the change amount $\alpha 1$ is correlated to the moving speed that is equal to or more than a km/h and smaller than b km/h, and the change amount $\alpha 2$ is correlated to the moving speed that is equal to or more than b km/h and smaller than c km/h, and the like, one of the change amounts may be a negative value, and another one of the change amounts may be a positive value or zero. For example, $\alpha 0 < \alpha 1 < 0 < \alpha 2 < \alpha 3 \ldots$ or $\alpha 0 < \alpha 1 < \alpha 2 = 0 < \alpha 3 < \alpha 4 \ldots$, which may be accordingly determined based on a configuration of the device. Further, although addition is used in the first embodiment, the embodiments are not limited thereto as long as the threshold value can be suitably changed. For example, subtraction or multiplication may be used.

Consequently, the cell-search threshold value is decreased by subtraction and becomes smaller than the initial threshold value in some cases. For example, when the cellular telephone is moving toward the base station device, the reception quality value increases, and therefore the cell-search threshold value can be set to be smaller than the initial threshold value. In this case, since the cell-search threshold value is set to be smaller, a state where the reception quality value is greater than the cell-search threshold value increases. When the reception quality value is greater than the cell-search threshold value, the cell search is terminated, and therefore a state where the cell search is terminated increases. When the cell search is terminated, the number of cell searches decreases, thereby reducing power consumption of the cellular telephone, and therefore enabling a reduction in wastage of the battery.

Although the second embodiment has explained the case where the reception quality value is decreased by subtraction, the condition of a', b', c', ... and x', y', ... are not limited to that shown in the second embodiment. For example, addition, multiplication, or subtraction may be used.

Although each of the embodiments has taken as an example, the case where the threshold value or the reception quality value is changed, the present invention is not limited thereto. For example, both values may be changed at the same time.

In the first embodiment, the speed-threshold relationship information storing unit 1532 may store speed-threshold relationship information predetermined at the time of manufacturing, or store speed-threshold relationship information received from the base station device. Alternatively, the speed-threshold relationship information storing unit 1532 may store both speed-threshold relationship information predetermined at the time of manufacturing (first speed-threshold relationship information) and speed-threshold relationship information received from the base station device (second speed-threshold relationship information).

Additionally, the threshold storing unit 1531 may store as the initial threshold value, a threshold value predetermined at the time of manufacturing the cellular telephone device 100. Alternatively, the threshold storing unit 1531 may store both the threshold value predetermined at the time of manufacturing and the threshold value received from the base station device.

When the speed-threshold relationship information storing unit 1532 stores both the speed-threshold relationship information predetermined at the time of manufacturing and the speed-threshold relationship information received from the base station device, the threshold changing unit 1052 may calculate based on the success rate of the cell search, an amount of change in the cell-search threshold value using speed-threshold relationship information selected from the predetermined speed-threshold relationship information and the received speed-threshold relationship information.

The threshold changing unit 1052 may select speed-threshold relationship information by prioritizing the speed-threshold relationship information predetermined at the time of manufacturing and the speed-threshold relationship information received from the base station device. For example, the threshold changing unit 1052 prioritizes the speed-threshold relationship information received from the base station device. In this case, the threshold changing unit 1052 may calculate an amount of change in the cell-search threshold value using the speed-threshold relationship information predetermined at the time of manufacturing, when the speed-threshold relationship information is not received from the base station device. Alternatively, the threshold changing unit 1052 may prioritize the speed-threshold relationship information predetermined at the time of manufacturing. In this case, the threshold changing unit 1052 may calculate an amount of change in the cell-search threshold value using the speed-threshold relationship information predetermined at the time of manufacturing, even when the speed-threshold relationship information is received from the base station device.

In the second embodiment, the speed-reception quality relationship information-storing unit 1533 may store speed-reception quality relationship information predetermined at the time of manufacturing, or store speed-reception quality relationship information received from the base station device. Alternatively, the speed-reception quality relationship information storing unit 1533 may store both speed-reception quality relationship information predetermined at the time of manufacturing (first speed-reception quality relationship information) and speed-threshold relationship information received from the base station device (second speed-reception quality relationship information).

Additionally, the threshold storing unit 1531 may store as the initial threshold value, a threshold value predetermined at the time of manufacturing the cellular telephone device 100. Alternatively, the threshold storing unit 1531 may store both the threshold value predetermined at the time of manufacturing and the threshold value received from the base station device.

When the speed-reception quality relationship information-storing unit 1533 stores both the speed-reception quality relationship information predetermined at the time of manufacturing and the speed-reception quality relationship information received from the base station device, the reception-quality changing unit 1076 may selects based on the success rate of the cell search, one of speed-reception quality relationship information selected from the predetermined speed-reception quality relationship information and the received speed-reception quality relationship information, and thereby calculate an amount of change in the reception quality value for the cell search by using the selected one.

The reception-quality changing unit 1076 may select speed-reception quality relationship information by prioritizing the speed-reception quality relationship information predetermined at the time of manufacturing and the speed-reception quality relationship information received from the base station device. For example, the reception-quality changing unit 1076 prioritizes the speed-reception quality relationship information received from the base station device. In this case, the reception-quality changing unit 1076 may calculate an amount of change in the cell-search reception quality value using the speed-reception quality relationship information predetermined at the time of manufacturing, when the speed-reception quality relationship information is not received from the base station device. Alternatively, the reception-quality changing unit 1076 may prioritize the speed-reception quality relationship information predetermined at the time of manufacturing. In this case, the reception-quality changing unit 1076 may calculate an amount of change in the cell-search reception quality value using the speed-reception quality relationship information predetermined at the time of manufacturing, even when the speed-reception quality relationship information is received from the base station device.

Although it is assumed in the above embodiments that the cellular telephone preliminarily has the functions of the present invention, the present invention is not limited thereto. For example, even if a cellular telephone cannot perform the control of the present invention, the configurations of the above embodiments are programmed, the program is loaded into a cellular telephone, and thereby the present invention can be implemented.

As a method of loading the program into the cellular telephone, the program can be loaded into the cellular telephone through a recording medium, such as a memory card. Alternatively, the program of the present invention is stored into a recording medium, such as CD-ROM or DVD, and then the program stored in the CD-ROM or the DVD can be written into the cellular telephone through a PC or the like which is connected to the cellular telephone.

Alternatively, the cellular telephone can download the program through the base station device. Alternatively, the program downloaded via the Internet or the like can be written into the cellular telephone through a PC or the like which is connected to the cellular telephone.

Although embodiments of the present invention are explained with reference to the accompanying drawings, specific configurations are not limited to the embodiments, and various modifications can be made without departing from the scope of the present invention.

INDUSTRIAL APPLICABILITY

The present invention is suitable for a mobile station device, a wireless communication system, and a similar technique, which are used for mobile communication. Even if the mobile station device is moving fast, the communication disabled state can be prevented, and the connection quality of the mobile station device can be maintained.

The invention claimed is:

1. A mobile station device configured to perform a cell search for searching a cell served by a base station device, and to select the base station device to be communicated with the mobile station device, the mobile station device comprising:
    a moving speed detector configured to detect a moving speed of the mobile station device;
    a transmitting-and-receiving unit configured to receive a radio wave transmitted from the base station device, and to initiate or to terminate the cell search based on a cell-search control signal input to the transmitting-and-receiving unit;
    a reception quality calculator configured to calculate a reception quality value indicative of the quality of the radio wave received by the transmitting-and-receiving unit;
    a threshold storing unit configured to store a threshold value for controlling the cell search;
    a changing unit configured to change at least one of the threshold value and the reception quality value based on the moving speed detected by the moving speed detector;
    a reception quality comparator configured to perform at least one of a comparison between the reception quality value and the threshold value changed, a comparison between the reception quality value changed and the threshold value, and a comparison between the reception quality value changed and the threshold value changed; and
    a control signal generator configured to output the cell-search control signal to the transmitting-and-receiving unit based on a result of the comparison performed by the reception quality comparator.

2. The mobile station device according to claim 1, wherein the threshold value stored by the threshold storing unit is transmitted from the base station device.

3. The mobile station device according to claim 1, further comprising:
   a speed-threshold relationship information storing unit configured to store speed-threshold relationship information in which the moving speed is correlated to an amount of change in the threshold value,
   wherein the changing unit is further configured to refer to the speed-threshold relationship information, to calculate an amount of change in the threshold value corresponding to the moving speed detected by the moving speed detector, and to change the threshold value by the amount of change.

4. The mobile station device according to claim 3, wherein the speed-threshold relationship information storing unit is further configured to store the speed-threshold relationship information that the mobile station device has received from the base station device.

5. The mobile station device according to claim 3, wherein the speed-threshold relationship information storing unit is
   further configured to store first speed-threshold relationship information that has been preliminarily stored and second speed-threshold relationship information that the mobile station device has received from the base station device, and
   the changing unit is further configured to change the threshold value by using speed-threshold relationship information selected from the first speed-threshold relationship information and the second speed-threshold relationship information.

6. The mobile station device according to claim 5, wherein the changing unit is further configured to select one of the first speed-threshold relationship information and the second speed-threshold relationship information based on information concerning a success rate of the cell search, and to change the threshold value using the selected one.

7. The mobile station device according to claim 1, further comprising:
   a speed-reception quality relationship information storing unit configured to store speed-reception quality relationship information in which the moving speed is correlated to an amount of change in the reception quality value,
   wherein the changing unit is further configured to refer to the speed-reception quality relationship information, to calculate an amount of change in the reception quality value corresponding to the moving speed detected by the moving speed detector, and to change the reception quality value by the amount of change.

8. The mobile station device according to claim 7, wherein the speed-reception quality relationship information storing unit is further configured to store the speed-reception quality relationship information that the mobile station device has received from the base station device.

9. The mobile station device according to claim 7, wherein the speed-reception quality relationship information storing unit is further configured to store first speed-reception quality relationship information that has been preliminarily stored and second speed-reception quality relationship information that the mobile station device has received from the base station device, and
   the changing unit is further configured to change the reception quality value by using speed-reception quality relationship information selected from the first speed-reception quality relationship information and the second speed-reception quality relationship information.

10. The mobile station device according to claim 9, wherein the changing unit is further configured to select one
of the first speed-reception quality relationship information and the second speed-reception quality relationship information based on information concerning a success rate of the cell search, and to change the reception quality value using the selected one.

11. The mobile station device according to claim 1, wherein the changing unit is further configured to change the initial threshold value to a higher value as the moving speed increases.

12. The mobile station device according to claim 1, wherein the changing unit is further configured to change the initial threshold value to a lower value as the moving speed increases.

13. The mobile station device according to claim 1, wherein the changing unit is further configured to change changes at least one of the threshold value and the reception quality value when the moving speed exceeds a predetermined speed.

14. A wireless communication system comprising:
   a base station device; and
   a mobile station device configured to perform a cell search for searching a cell served by a base station device, and to select the base station device to be communicated with the mobile station device,
   wherein the mobile station device comprises:
      a moving speed detector configured to detect a moving speed of the mobile station device;
      a transmitting-and-receiving unit configured to receive a radio wave and a cell-search control signal which are transmitted from the base station device, to transmit a reception quality value indicative of the quality of the radio wave and the moving speed detected by the moving speed detector to the base station device, and to initiate or to terminate the cell search based on the cell-search control signal input to the transmitting-and-receiving unit;
      a reception quality calculator configured to calculate the reception quality value of the radio wave received by the transmitting-and-receiving unit;
      a mobile station information transmitter configured to output the reception quality value calculated by the reception quality calculator and the moving speed detected by the moving speed detector to the transmitting-and-receiving unit,
   the base station device comprises:
      a transmitting-and-receiving unit configured to receive the moving speed and the reception quality value from the mobile station device, and to transmit the cell-search control signal to the mobile station device;
      a threshold storing unit configured to store a threshold value for controlling the cell search;
      a changing unit configured to change at least one of the threshold value and the reception quality value based on the moving speed detected by the moving speed detector;
      a reception quality comparator configured to perform at least one of a comparison between the reception quality value and the threshold value changed, a comparison between the reception quality value changed and the threshold value, and a comparison between the reception quality value changed and the threshold value changed; and
      a controller configured to output the cell-search control signal to the transmitting-and-receiving unit based on a result of the comparison performed by the reception quality comparator.

15. A method of controlling a mobile station device that is configured to perform a cell search for searching a cell served by a base station device, and to select the base station device to be communicated with the mobile station device, the method comprising:
- detecting a moving speed of the mobile station device;
- receiving a radio wave transmitted from the base station device;
- calculating a reception quality value indicative of the quality of the received radio wave;
- changing at least one of the threshold value and the reception quality value based on the detected moving speed;
- performing at least one of a comparison between the reception quality value and the threshold value changed, a comparison between the reception quality value changed and the threshold value, and a comparison between the reception quality value changed and the threshold value changed; and
- initiating or terminating the cell search based on a result of the comparison performed.

16. The method according to claim 15, further comprising:
- storing speed-threshold relationship information in which the moving speed is correlated to an amount of change in the threshold value;
- calculating an amount of change in the threshold value corresponding to the moving speed detected by the moving speed detector by referring to the stored speed-threshold relationship information; and
- changing the threshold value by the amount of change.

17. A non-transitory computer-readable medium having instructions stored thereon, such that when the instructions are read and executed by a processor, the processor is configured to perform the steps of:
- detecting a moving speed of a mobile station device;
- receiving a radio wave transmitted from a base station device;
- calculating a reception quality value indicative of the quality of the received radio wave;
- changing at least one of the threshold value and the reception quality value based on the detected moving speed;
- performing at least one of a comparison between the reception quality value and the threshold value changed, a comparison between the reception quality value changed and the threshold value, and a comparison between the reception quality value changed and the threshold value changed; and
- initiating or terminating a cell search based on a result of the comparison performed.

18. The non-transitory computer-readable medium according to claim 16, further storing instructions such that when read and executed by said processor configure said processor to further perform the steps of:
- storing speed-threshold relationship information in which the moving speed is correlated to an amount of change in the threshold value;
- calculating an amount of change in the threshold value corresponding to the moving speed detected by the moving speed detector by referring to the stored speed-threshold relationship information; and
- changing the threshold value by the amount of change.

* * * * *